(12) United States Patent
Loibl et al.

(10) Patent No.: US 7,180,031 B1
(45) Date of Patent: Feb. 20, 2007

(54) ELECTRICAL CONNECTION IN GLAZING OPERATIONS

(75) Inventors: Joseph M. Loibl, Farmington Hills, MI (US); Marcus Tanksley, Farmington, MI (US); Larry Agius, Dearborn, MI (US); Robert W. Hatcher, Novi, MI (US); Thomas M. Cleary, Bellville, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 15 days.

(21) Appl. No.: 11/229,811

(22) Filed: Sep. 19, 2005

(51) Int. Cl.
*H05B 1/02* (2006.01)

(52) U.S. Cl. .................. 219/203; 219/541; 219/593; 174/68.1; 439/264

(58) Field of Classification Search ............ 219/203, 219/522, 541, 219, 543, 202; 338/306–309, 338/322, 327, 328; 439/264, 76.1, 78; 174/68.1
See application file for complete search history.

(56) References Cited

U.S. PATENT DOCUMENTS

| | | | |
|---|---|---|---|
| 6,187,242 B1 * | 2/2001 | Onoda | 264/255 |
| 6,416,341 B1 * | 7/2002 | Platz | 439/264 |
| 6,703,586 B1 * | 3/2004 | Kast | 219/203 |
| 6,906,287 B2 * | 6/2005 | Sol | 219/203 |

* cited by examiner

*Primary Examiner*—Mark Paschall
(74) *Attorney, Agent, or Firm*—MacMillan, Sobanski & Todd, LLC

(57) ABSTRACT

A power connection apparatus of a vehicle is provided that includes a pair of substantially flat electrical conductor strips each having a first end and a second end. The first ends are adapted to be electrically coupled to integrated heater conductors in an automobile glazing. A film forms a protective coating over an intermediate section of the pair of electrical conductor strips. The film insulates and maintains a spaced relationship between the pair of substantially flat electrical conductors. A pair of wires is electrically coupled to the second ends. A first protective overmold seal is formed over the second ends of the pair of substantially flat electrical conductor strips for sealing the electric coupling of the second ends of electrical conductor strips and the wires.

30 Claims, 3 Drawing Sheets

A-A

B-B

ELECTRICAL CONNECTION IN GLAZING OPERATIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

This invention relates in general to a heated windshield system, and more specifically, to a power connection for providing power to a heated windshield system in a wet area in a vehicle.

Windshield defrost systems typically generate heat, in the form of forced air or conducted heat from window-mounted heating elements to defrost ice build up on a windshield. Heating elements integrated within the windshield offer a uniform and even defrost pattern across the windshield as opposed to forced air. The heating elements include a plurality of fine wires that are embedded within a vinyl intermediate layer of the windshield. The vinyl intermediate layer is sandwiched between two glass panes. Electrical current is conducted through the fine wire elements for defrosting the windshield. The electrical current carried through the fine wires causes an increase in the temperature of the wire element which is transferred to the glass. The heat melts ice build up on the windshield and evaporates moisture formed thereon.

A typical heated windshield utilizing fine heating wire elements requires the use of a large amount of power, such as 300 Watts to 1200 Watts. This power is obtained by applying a specific voltage to a predetermined resistance to achieve the desired heat in the glazing system. Power is supplied to the windshield glazing system from an external power source, such as a vehicle battery, alternator, or other device. In order to obtain proper heating of the heating wire elements, power to the heating wire elements must be transmitted from the power source to the windshield glazing system without any significant power loss, especially through the connector. The connector must be able to withstand exposure to environmental elements such as moisture (i.e., water) or chemical solvents such as windshield washer solvent.

A typical connector for a windshield defrost system is electrically connected to the windshield glazing system in the upright pillars (i.e., A-pillars) of the supporting vehicle body frame of the windshield. The connector is typically coupled to a power source harness in the A-pillar. The internal structure of the A-pillar is considered a dry-environment which is typically protected from environmental conditions external to the vehicle. While packaging the connector in the A-pillar maintains a dry environment for the connector, it may be disadvantageous to access the connector. For windshield systems where the windshield and the windshield glazing system connectors are provided as a preassembled package for assembly to the vehicle, access to the connector as well as packaging the connector within the A-pillar as it is assembled may be difficult.

For a windshield heating system where the electrical connection is made at the bottom of the windshield, ample space is usually available near the engine compartment (i.e., cowl area) located below the windshield for packaging the electrical connector. However, this location is considered a wet environment as water run-off from the windshield is directed and routed through this region. A connector packaged in this location must be capable of withstanding the water and its freezing corrosive effects as well as thermal cycling caused from the outside ambient weather conditions and the temperatures generated by the heat of an operating engine.

BRIEF SUMMARY OF THE INVENTION

The present invention has an advantage providing an electrical connection between a power supply and resistive circuit embedded between a pair of panes where the electrical connection is disposed in a wet region of the vehicle. The electrical connection provides a hermetic seal for preventing short circuits caused by water or chemical solvent intrusion and for preventing corrosion of the electrical connection. The present invention allows the electrical connection to be made in wet environments so as to not limit the packaging locations.

In one aspect of the present invention, a power connection apparatus of a vehicle is provided that includes a pair of substantially flat electrical conductor strips each having a first end and a second end. The first ends are adapted to be electrically coupled to integrated heater conductors in an automobile glazing. A polyimide film forms a protective coating over an intermediate section of the pair of electrical conductor strips. The polyimide film insulates and maintains a spaced relationship between the pair of substantially flat electrical conductors. A pair of wires is electrically coupled to the second ends. A first protective overmold seal is formed over the second ends of the pair of substantially flat electrical conductor strips for sealing the electric coupling of the second ends of electrical conductor strips and the wires.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
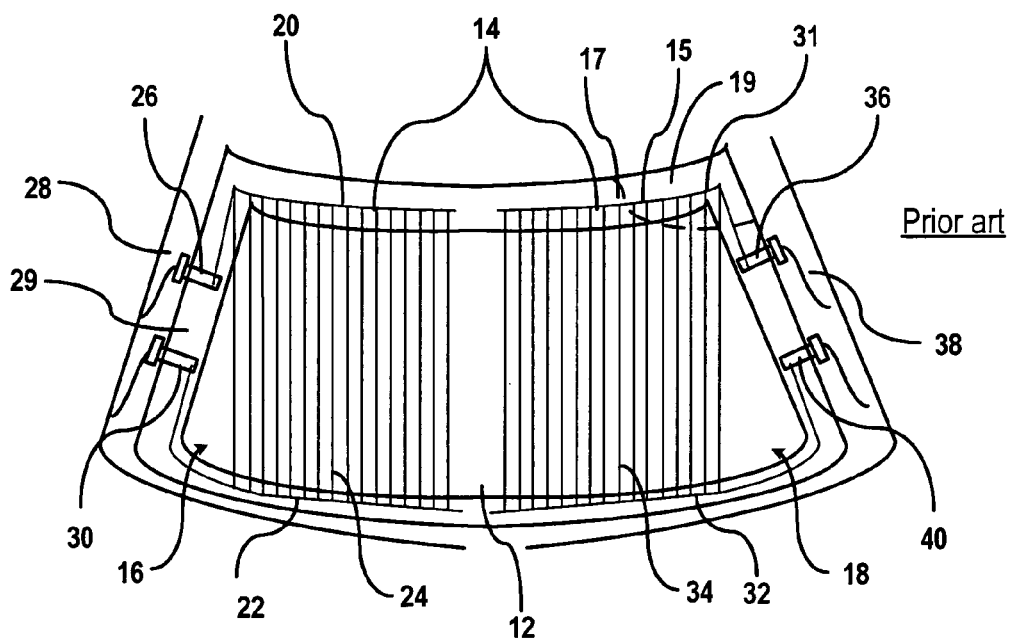
FIG. 1 is an illustration of a prior art heated windshield system.

Referring now to the drawings, there is illustrated in FIG. 1, a typical prior art heated windshield system 10. The heated windshield system typically includes a windshield 12 with an integrated heating windshield circuit 14 embedded within the windshield 12. The heating circuit 14 is embedded in an intermediate layer 15, (e.g., a vinyl layer), between a first transparent pane 17 and a second transparent pane 19 in a glazing operation. Preferably, the two transparent panes are preferably produced from glass. Alternatively, the transparent panes may be produced from a material composition other than glass.

The heated windshield circuit 14 includes a first heating section 16 and a second heating section 18. The first heating section 16 includes a positive bus bar 20 disposed on an upper-left half portion of the windshield 12 and a negative bus bar 22 disposed on a lower-left half portion of the windshield. A plurality of fine wire elements 24 are connected between the positive bus bar 20 and the negative bus bar 22. The fine wire elements 24 are substantially transparent. The bus bars 20 & 22 are typically concealed behind an obscuration band 29 applied around the perimeter of the windshield. A first connector 26 is disposed in a passenger's side A-pillar 28 and is electrically connected to the positive bus bar 20. A second connector 30 is also disposed in the passenger's side A-pillar 28 and is electrically connected to the negative bus bar 22. The first connector 26 and second connector 30 are also electrically connected to a respective wire harness for receiving power from a power source. Power is provided to the first heating section 16 by generating voltage and current to the positive bus bar 20 and negative bus bar 22 via the first and second connectors 26 and 30. The plurality of wire elements 24 comprise a resistive circuit which generates heat and transfers the heat to the windshield 12 for defrosting the first heating section 16 of the windshield 12.

The second heating section 18 includes a positive bus bar 31 disposed on an upper-right half portion of the windshield 12 and a negative bus bar 32 disposed on a lower-right half portion of the windshield 12. A plurality of fine wire elements 34 are connected between the positive bus bar 31 and the negative bus bar 32. A third connector 36 is disposed in a driver's side A-pillar 38 and is electrically connected to the positive bus bar 31. A second connector 40 is also disposed in the driver's side A-pillar 38 and is electrically connected to the negative bus bar 32. The third and fourth connector 36 and 40 are electrically connected to a respective wire harness for receiving power from a power source. Power is provided to the second heating section 18 by generating voltage and current to the positive bus bar 31 and negative bus bar 32 via the third and fourth connectors 36 and 40. The plurality of wire elements 34 comprise a resistive circuit which generates heat and transfers the heat to the windshield 12 for defrosting the second heating section 18 of the windshield 12.

Electrical connectors 26, 30, 36, and 40 disposed in a respective A-pillar region are routed flat against the inside windshield surface and the connection to the electrical system made on the interior side of an adhesive bead which is applied to seal the windshield to the vehicle's body. Therefore, the connectors are not subject to water or moisture build up. Therefore, electrical connectors 26, 30, 36, and 40 do not require a sealed or watertight electrical connection.

Figure 2:
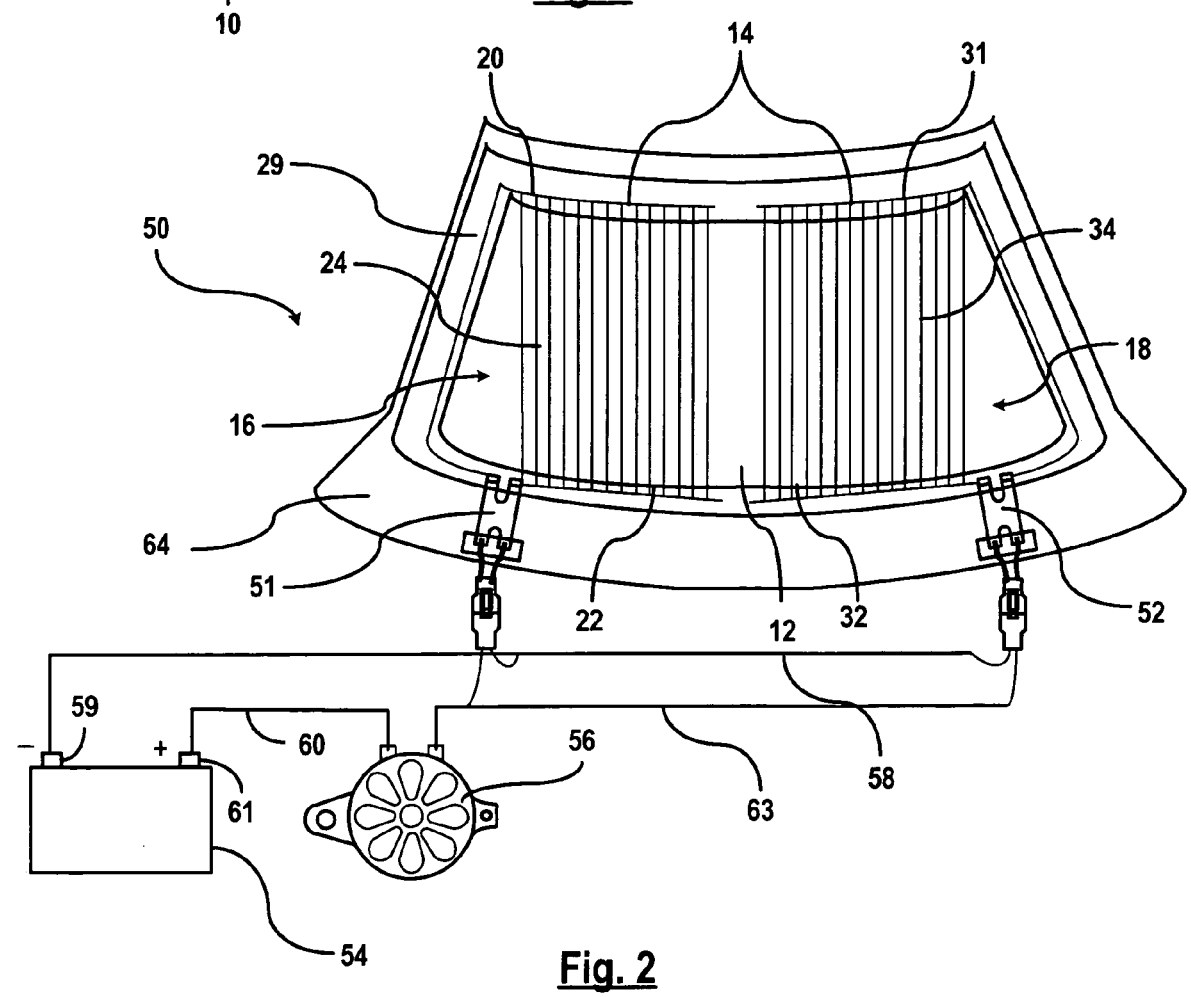
FIG. 2 is an illustration of a heated windshield system according to a first preferred embodiment of the present invention.

FIG. 2 illustrates a heated windshield system according to a first preferred embodiment of the present invention. Using same numerals for like references, there is shown a heated windshield system 50 having an electrical connector 51 and an electrical connector 52 for receiving power from an electrical distribution system for energizing the heated windshield circuit 14. The electrical distribution system includes a battery 54 for supplying battery voltage to a voltage generating device such as an alternator 56. The alternator 56 generates the supply voltage and current so that the nominal operating voltage and current may be provided to the heated windshield circuit 14. Circuit 58 is electrically connected to a negative terminal 59 of the battery 54 and is also connected to electrical connectors 51 and 52. Circuit 60 is electrically connected to a positive terminal 61 of the battery 54 for providing battery voltage to the alternator 56. Circuit 63 is electrically connected from a B+ terminal (output regulated voltage) of the alternator 56 and is supplied to electrical connectors 51 and 52.

Electrical connectors 51 and 52 are electrically coupled to the first heated section 16 and second heated section 18, respectively, at the lower portions of the windshield 12. Electrical connectors 51 and 52 are disposed in a cowl region 64 which is primarily a wet region of the vehicle. Water runoff and washer solvent from the windshield is directed through the cowl region 64.

Figure 3:
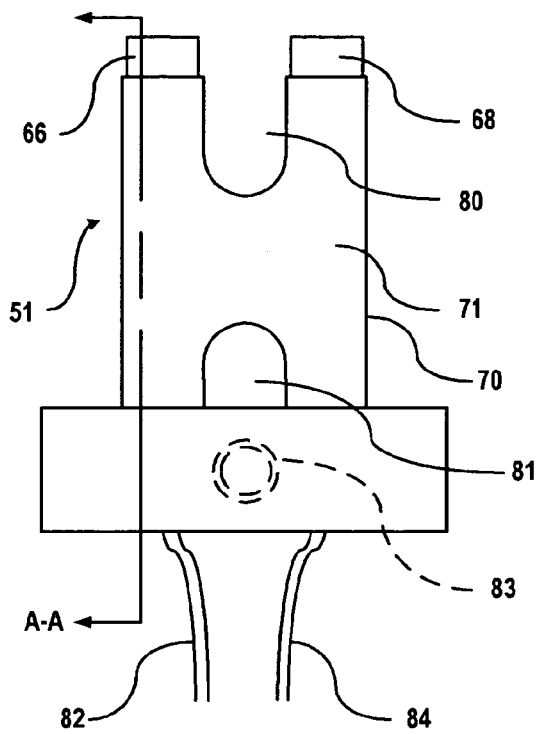
FIG. 3 is a plan view of a conductor according to the first preferred embodiment of the present invention.
Figure 4:
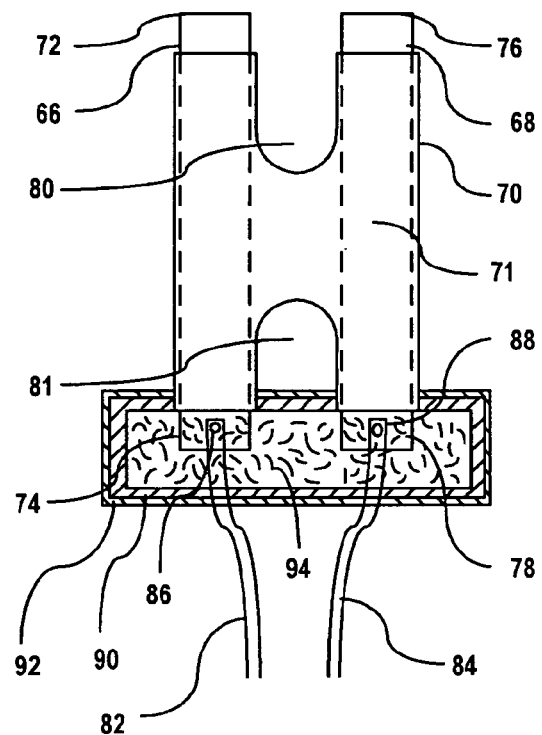
FIG. 4 is a cross section of a conductor according to the first preferred embodiment of the present invention.

FIG. 3 and FIG. 4 illustrate the electrical connector 51 according to the first preferred embodiment of the present invention. Electrical connector 51 includes a first substantially flat electrical conductor strip 66 and a second substantially flat electrical conductor strip 68. Preferably the conductor strips are made of flat piece of copper foil having a thickness of preferably 0.0042 inches. Alternatively, the copper foil may use various thicknesses as well as utilizing other conductive materials. Also the conductor may be a substantially flat braided wire as opposed to foil. The first conductor strip 66 and the second conductor strip 68 are substantially parallel to one another.

A film 70 is used to form a protective insulative coating over an intermediate section 71 of the first and second conductive strips 66 and 68. Preferably, the film 70 is a polyimide film, such as Kapton®. Alternatively, other films such as polymer based films may be used. An exposed conductive portion is formed at a first end 72 of the first conductive strip 66 and an exposed conductive portion is formed at a second end 74 of the first conductive strip 66. Similarly, an exposed conductive portion is formed at a first end 76 of the second conductive strip 68 and an exposed conductive portion is formed at a second end 78 of the second conductive strip 68. The polyimide film 70 integrally formed over the first and second conductor strips 66 and 68 insulate each respective conductive strip from one another while providing protection against moisture and chemical solvents. The polyimide film 70 also maintains a spaced relationship between the first and second substantially conductive strips 66 and 68.

A slot 80 having a predetermined width and length (e.g., 17 mm length and 4 mm width) is formed between the first conductor strip 66 and the second conductor strip 68 initiating at the first ends 72 and 76. The slot extends longitudinally into a portion of the intermediate section 71 between the first conductive strip 66 and the second conductor strip 68. A slot 81 having a predetermined width and length is formed between the first conductor strip 66 and the second conductor strip 68 initiating at the second ends 74 and 78. The slot extends longitudinally into a portion of the intermediate section 71 between the first conductive strip 66 and the second conductor strip 68. The slots prevent water and moisture from bridging across the conductive portions between each conductive strip. The slots 80 and 81 use various sized widths and lengths which are appropriate for respective applications.

A wire 82 for supplying power to the first heated section 16 is connected to the first conductor strip 66 at the second end 74 of the first conductive strip 66 by an electrical coupling 86. A wire 84 for supplying ground to the first heating section 16 is connected to the second conductor strip 68 at the second end 78 of the second conductive strip 68 by an electrical coupling 88. In the preferred embodiment, the electrical coupling includes a solder connection. Alternatively, other methods for providing the electric coupling may be utilized such as welding, crimping or other electrical attachment means. Electrical connector 52 (shown in FIG. 2) includes two wires for supplying power and ground to the second heated section 18. The wire for supplying power to the second heated section 18 is disposed on the outside terminal (as shown in FIG. 2). The wire for supplying ground to the second heating section 18 is disposed on the inside terminal. Preferably, the wires for supplying power are configured on the outer sides (with respect to the windshield) of the each respective connector. Alternatively, other electrical configurations can be used such as supplying power on the inside terminals and ground on the outside terminals, or providing power to a respective first side terminal and ground to a respective second side terminal regardless of whether the connector is located on the drivers or passengers side of the windshield.

A framework 90 is disposed over electrical couplings 86 and 88 including a portion of the intermediate section 71 and wires 82 and 84. Preferably, the framework 90 is made of a molded plastic material or plastic composite. Alternatively, the framework may be produced by other material compositions. The framework 90 provides a structural protective support for preventing structural damage to the electrical couplings 86 and 88. Preferably, the framework 90 is an integral clamshell protective cover having a plastic hinge which allows the framework 90 to enclose the electrical coupling 86 and 88. Alternatively other structural framework members may be used including structures having two or more structural members that are separately formed and coupled together. The framework 90 includes a tab member 83 for attachment to a vehicle body or vehicle frame structural member for securing the power connection to the vehicle. The tab member 83 may include a push-pin type tab that inserts into an aperture in the vehicle body or vehicle frame structural member or may include a hollow stud which receives a stud or bolt affixed to the vehicle member.

A first protective seal 92 is formed over the exterior surface of the framework 90. The first protective seal 92 may include a thermoplastic vulcanizate such as Sarlink® which is a material having the properties of rubber but can be processed as a plastic. As a result, the framework 90 provides a surrounding surface area in which the first protective seal 92 is injection molded onto for sealing the electrical couplings 86 and 88.

An adhesion promoter 94, such as Chemlock® which is an adhesive used with rubber-like material to enhance the bonding between the first protective seal and the overmolded components, is placed on the framework 90, wires 82 and 84, and segments of the intermediate section 71 to which the first protective seal 92 will adhere. The adhesion promoter 94 assists the first protective seal 92 in attaching to the framework 90 and the underlying components. Alternatively, other types of adhesion promoters may be used. Moreover, the adhesion promoter 94 may be applied directly to the electric coupling if a framework is not utilized.

Figure 5:
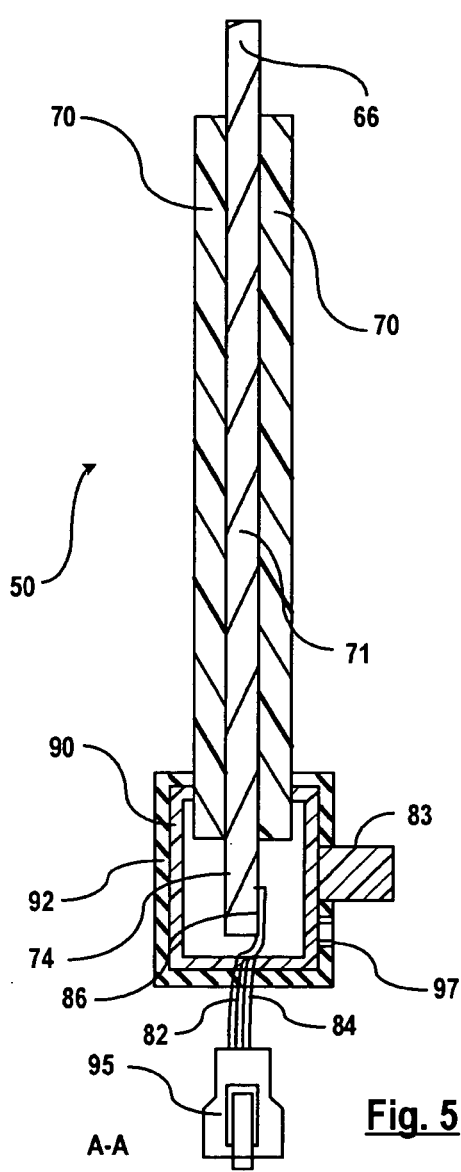
FIG. 5 is a cross section of a conductor according to the first preferred embodiment of the present invention.

FIG. 5 illustrates a cross sectional view shown at A—A in FIG. 3. The polyimide film 70 is formed over the intermediate section 71 of the first conductor strip 66. The framework 90 is disposed over the second end 74 of the first conductor strip 66. The framework 90 is also disposed over a portion of the intermediate section 71 and wire 82. The electrical coupling 86 conductively joins wire 82 and the second end 74 of the first conductor strip 66. The first protective seal 92 is formed (e.g., injection molded) over the framework 90 and the underlying components. Wire 82 and wire 84 protrude from the first protective seal 92 and are coupled to a pigtail connector 95. The connector 95 is electrically connected to a power supply circuit (not shown) via a wire harness for supplying power to the window heating circuit 16 (shown in FIG. 2).

Figure 6:
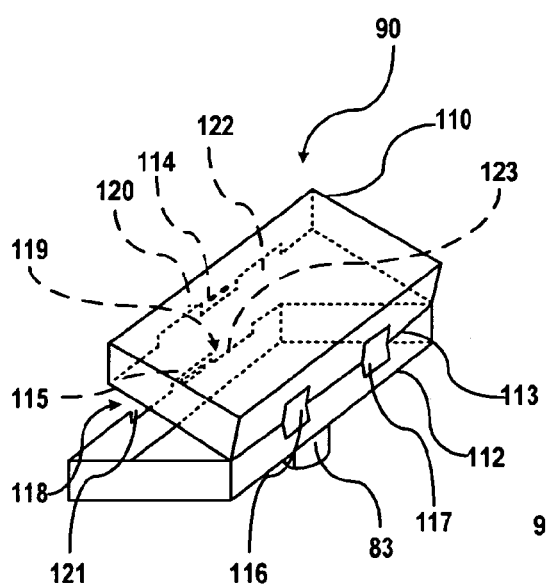
FIG. 6 is a framework according to the first preferred embodiment of the present invention.

FIG. 6 illustrates the framework 90 according to a first preferred embodiment of the present invention. The framework 90 includes an upper shell casing 110 and a lower shell casing 112 that are integrally connected by a plastic hinge 113. The upper shell casing 110 and the lower shell casing 112 are pivotable about the plastic hinge 113 to form a clamshell about the electrical connections therein. The upper shell casing 110 includes a bumped surface area 114 that aligns with a recessed area 115 of the lower shell casing 115 when the upper shell casing 110 and the lower shell casing 112 are pivotably closed. The bumped surface area 114 and the recessed area 115 provide an interference condition for interlocking the upper shell casing 110 and lower shell casing 112 for maintaining a closed position.

A first aperture 116 and a second aperture 117 are formed in a first side of the framework for receiving the wires 82 and 84 (shown in FIG. 5). The upper shell casing 110 and the lower shell casing 112 form a third aperture 118 and a fourth aperture 119 on an opposing side of the framework 90 for receiving the second end 74 of the first conductive strip 66 and the second end 78 of the second conductive strip 68, respectively. A first notched portion 120 aligns with a second notched portion 121 for forming the third aperture 118 when the upper shell casing 110 and the lower shell casing 112 are closed. A third notched portion 122 aligns with a fourth notched portion 123 for forming the fourth aperture 119 when the upper shell casing 110 and the lower shell casing 112 are closed. Alternatively, the framework 90 may include two shell casings separately formed and coupled together to form a single shell casing.

Figure 7:
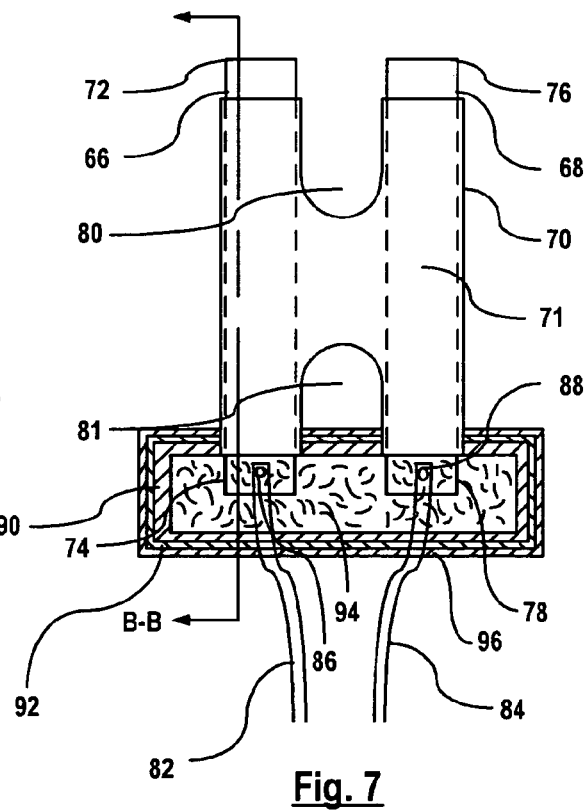
FIG. 7 is a cross section of a conductor according to a second preferred embodiment of the present invention.
Figure 8:
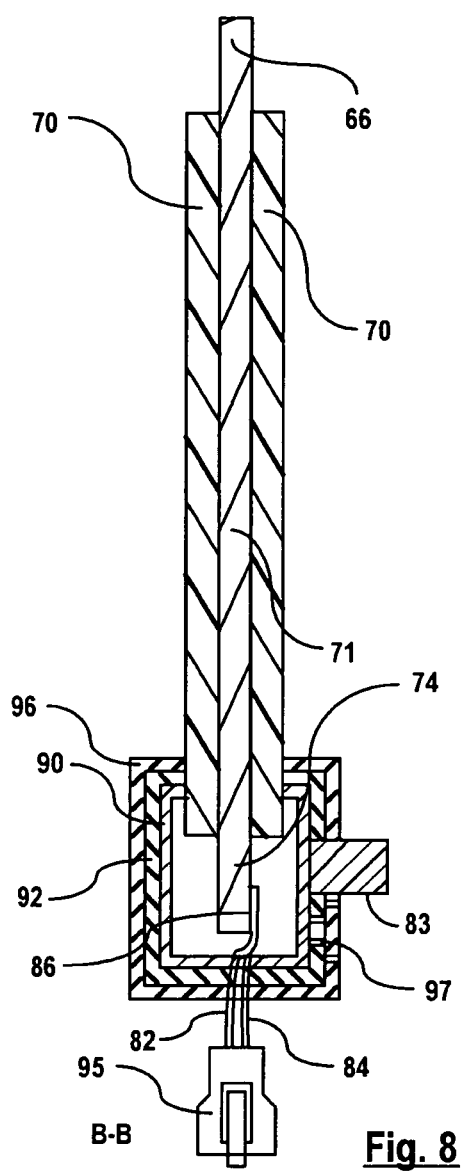
FIG. 8 is a cross section of a conductor according to the second preferred embodiment of the present invention.

FIG. 7 and FIG. 8 illustrate a power connection according to a second preferred embodiment of the present invention. Using same numerals for similar elements, the power connection illustrated in FIG. 7 and FIG. 8 is the same as that described in FIG. 4 and FIG. 5 with the addition of a second protective seal 96. The second protective seal 96 is used to seal openings 97 formed in the first protective seal 92 during the overmolding process.

During the overmold of the first protective seal 92, pins (not shown) may be inserted in the die mold to hold the structure to be overmolded in place while the injection molding process is performed. The pins form openings 97 in the overmold after the pins are removed which may create a passageway for moisture or chemical solvents (i.e., washer fluid) to enter first protective seal 92 and contact the electrical coupling 86 (and coupling 88). Moisture or other fluids having conductive properties may result in a short circuit or cause corrosion of the electrical connection between the first connector strip 66 and the second conductor strip 68. Overmolding a second protective seal 96 over the first protective seal 92 hermetically seals the openings 97 formed in the first protective seal 92. If pins (not shown) are used to position the first overmolded unit during the second overmolding process, the pins for the second overmolding process may be placed at different locations than the first overmolding process.

Figure 9:
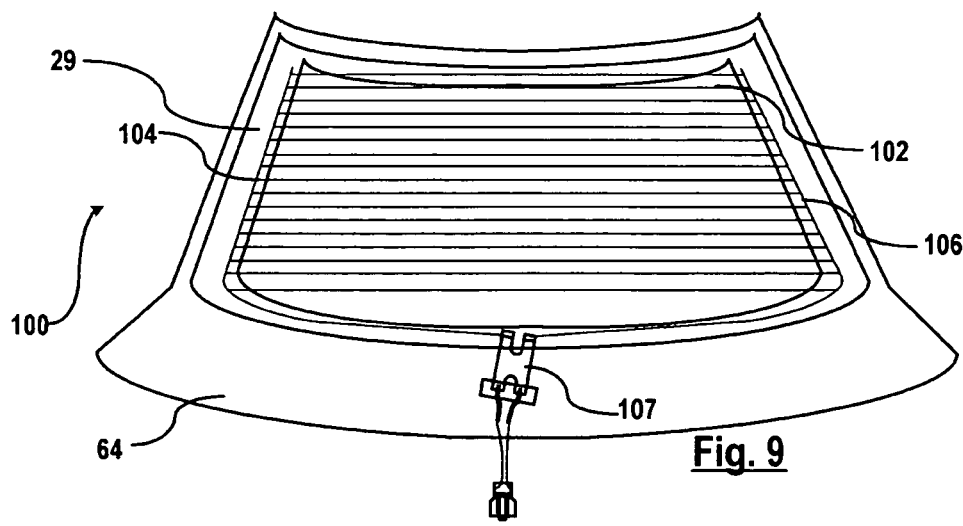
FIG. 9 is an illustration of a heated windshield system according to a third preferred embodiment of the present invention.

FIG. 9 illustrates windshield heating system according to a third preferred embodiment of the present invention. The windshield heating circuit 100 includes a single heating section where the plurality of heating elements are disposed horizontally across the window pane. A positive bus bar 104 and a negative bus bar 106 are disposed on opposite ends of the window pane and are electrically connected to one another by the plurality of heating elements 102. A single power connection 107 is used to provide power to the windshield heating circuit as opposed to the two jumper harnesses as illustrated in FIG. 2. Similar to FIG. 2, the jumper harness is disposed in the cowl region 64 of the vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power connection apparatus of a vehicle comprising:
   a pair of substantially flat electrical conductor strips each having a first end and a second end, wherein said first ends are adapted to be electrically coupled to integrated heater conductors in an automobile glazing;
   a film forming a protective coating over an intermediate section of said pair of electrical conductor strips, said film insulating and maintaining a spaced relationship between said pair of substantially flat electrical conductors;
   a pair of wires electrically coupled to said second ends;
   a first protective overmold seal formed over said second ends of said pair of substantially flat electrical conductor strips for sealing said electric coupling of said second ends of electrical conductor strips and said wires; and
   a second protective overmold seal formed over said first protective overmold seal.

2. The power connection apparatus of claim 1 wherein said pair of substantially flat electrical conductors electrically coupled to said wires and said integrated heater conductors of said automobile glazing are disposed in a wet environment of said vehicle.

3. The power connection apparatus of claim 1 wherein an adhesion promoter is disposed on said second ends of said electrical conductor strips and said wires to assist in attaching said first protective overmold cover to said second ends of said electrical conductor strips and said wires prior to an overmold operation.

4. The power connection apparatus of claim 1 further comprising a framework disposed over said electric coupling of said second ends of said electrical conductor strips and said wires for providing structural support to said electric coupling wherein said framework is overmolded by said first protective overmold seal.

5. The power connection apparatus of claim 4 wherein an adhesion promoter is disposed on said framework, on a segment of said intermediate section, and on said wires to assist in attaching said first protective overmold seal to said framework, said segment of said intermediate section, and said wires prior to an overmold operation.

6. The power connection apparatus of claim 1 wherein said film includes a slot having a predetermined width and length formed between said first conductor strip and said second conductor strip initiating at said second ends and extending longitudinally into a portion of said intermediate section, wherein said first protective overmold seal is formed over a portion of said slot.

7. The power connection apparatus of claim 1 wherein said film includes a slot having a predetermined width and length formed between said first conductor strip and said second conductor strip initiating at said first ends and extending longitudinally into a portion of said intermediate section.

8. The power connection apparatus of claim 1 wherein said second protective overmold seal hermetically seals openings formed in the said first protective overmold seal.

9. The power connection apparatus of claim 1 wherein said film includes a polyimide film.

10. The power connection apparatus of claim 1 wherein said film includes a polymer based film.

11. A defrost system for an automotive glazing comprising:
    a first transparent pane;
    a second transparent pane;
    an intermediate layer including integrated heater conductors disposed between said first transparent pane and said second transparent pane, said integrated heater conductors including a positive bus bar, a negative bus bar, and a plurality of wire elements, said plurality of wire elements extending between said positive bus bar and said negative bus bar;
    a power connection for electrically connecting a power supply circuit to said heating circuit, said power connection comprising:
       a first substantially flat electrical conductor strip and a second substantially flat electrical conductor strip each having a first end and a second end, said first ends of said first and second substantially flat electrical conductor strips are disposed between said first transparent pane and said second transparent pane and are electrically coupled to a integrated heater conductors in an automobile glazing;
       a pair of wires electrically coupled to said second ends of said first and second substantially flat electrical conductors for providing electrical power to said integrated heater conductors;
       a film forming a protective coating over an intermediate section of said pair of electrical conductor strips, said film insulating and maintaining a spaced relationship between said pair of substantially flat electrical conductors;
       a first protective overmold seal formed over said second ends of said pair of substantially flat electrical conductor strips for insulating said electric coupling of said second ends of said conductor strips and said wires; and
       a second protective overmold seal formed over said first protective overmold seal.

12. The defrost system of claim 11 wherein an adhesion promoter is disposed on said second ends of said electric coupling and said wires to assist in attaching said first protective overmold cover to said second ends of said substantially flat electrical conductor strips prior to an overmold operation.

13. The defrost system circuit of claim 11 further comprising a framework disposed over said electric coupling of said second ends of said electrical conductor strips and said wires for providing structural support to said electric coupling wherein said framework is overmolded by said first protective overmold seal.

14. The defrost system of claim 11 wherein an adhesion promoter is disposed on said framework, on a segment of said intermediate section, and on said wires to assist in attaching said first protective overmold seal to said framework, said segment of said intermediate section, and said wires prior to an overmold operation.

15. The defrost system of claim 11 wherein said film includes a slot having a predetermined width and length formed between said first conductor strip and said second conductor strip initiating at said second ends and extending longitudinally into a portion of said intermediate section, wherein said first protective overmold seal is formed over a portion of said slot.

16. The defrost system of claim 11 wherein said film includes a slot having a predetermined width and length formed between said first conductor strip and said second conductor strip initiating at said first ends and extending longitudinally into a portion of said intermediate section.

17. The defrost system of claim 11 wherein said film includes a polyimide film.

18. The defrost system of claim 11 wherein said film includes a polymer based film.

19. The defrost apparatus of claim 11 wherein said pair of substantially flat electrical conductors electrically coupled to said wires and said integrated heater conductors of said automobile glazing are disposed in a wet environment of said vehicle.

20. A method of making a power connector having first ends and second ends for supplying power from a power supply circuit to integrated heater conductors in a vehicle, said method comprising the steps of:
aligning a first substantially flat electrical conductor strip substantially parallel to a second substantially flat electrical conductor strip;
forming a protective film seal over an intermediate section of said first and second substantially flat electrical conductor strips for insulating and maintaining a spaced relationship between said first substantially flat electrical conductor strip and said second substantially flat electrical conductor strip;
electrically coupling said second end of said substantially flat electrical conductor strips to a pair of wires;
forming a first protective seal over said electric coupling;
forming a second protective overmold seal over said first protective overmold seal for hermetically sealing openings in said first protective overmold seal;
disposing said first ends of said first and second substantially flat electrical conductor strips between said first transparent pane and said second transparent pane; and
electrically coupling said first ends of said first and second substantially flat electrical conductor strips to said integrated heater conductors in an automobile glazing.

21. The method of claim 20 further comprising the step of applying an adhesion promoter to said substantially flat electrical conductor strips prior to overmolding said first protective overmold seal.

22. The method of claim 20 further comprising the step of disposing a framework over said electric coupling of said second ends of said electrical conductor strips and said wires for providing structural support to said electric coupling wherein said framework is overmolded by said first protective overmold seal.

23. The method of claim 22 further comprising the step of applying an adhesion promoter to said framework, to a segment of said intermediate section, and to a portion of said wires to assist in attaching said first protective overmold seal to said framework, said segment of said intermediate section, and said wires during an overmold operation.

24. The method of claim 20 further comprising the step of forming a slot having a predetermined width and length between said first conductor strip and said second conductor strip initiating at said second ends and extending longitudinally into portion of said intermediate section, wherein said first protective overmold seal is formed over a portion of said slot.

25. The method of claim 20 further comprising the step of forming a second slot having a predetermined width and length between said first conductor strip and said second conductor strip initiating at said first ends and extending longitudinally into a portion of said intermediate section.

26. The method of claim 20 wherein said power connector is formed with an automobile glazing for packaging said power connector in a wet environment of said vehicle.

27. A power connection apparatus of a vehicle comprising:
a pair of substantially flat electrical conductor strips each having a first end and a second end, wherein said first ends are adapted to be electrically coupled to integrated heater conductors in an automobile glazing;
a film forming a protective coating over an intermediate section of said pair of electrical conductor strips, said film insulating and maintaining a spaced relationship between said pair of substantially flat electrical conductors;
a pair of wires electrically coupled to said second ends;
a first protective overmold seal formed over said second ends of said pair of substantially flat electrical conductor strips for sealing said electric coupling of said second ends of electrical conductor strips and said wires; and
a slot having a predetermined width and length formed between said first conductor strip and said second conductor strip initiating at said second ends and extending longitudinally into a portion of said intermediate section, wherein said first protective overmold seal is formed over a portion of said slot.

28. A power connection apparatus of a vehicle comprising:
a pair of substantially flat electrical conductor strips each having a first end and a second end, wherein said first ends are adapted to be electrically coupled to integrated heater conductors in an automobile glazing;
a film forming a protective coating over an intermediate section of said pair of electrical conductor strips, said film insulating and maintaining a spaced relationship between said pair of substantially flat electrical conductors;
a pair of wires electrically coupled to said second ends;
a first protective overmold seal formed over said second ends of said pair of substantially flat electrical conductor strips for sealing said electric coupling of said second ends of electrical conductor strips and said wires; and a slot having a predetermined width and length formed between said first conductor strip and said second conductor strip initiating at said first ends and extending longitudinally into a portion of said intermediate section.

29. A power connection apparatus of a vehicle comprising:
   a pair of substantially flat electrical conductor strips each having a first end and a second end, wherein said first ends are adapted to be electrically coupled to integrated heater conductors in an automobile glazing;
   a film forming a protective coating over an intermediate section of said pair of electrical conductor strips, said film insulating and maintaining a spaced relationship between said pair of substantially flat electrical conductors;
   a pair of wires electrically coupled to said second ends;
   a first protective overmold seal formed over said second ends of said pair of substantially flat electrical conductor strips for sealing said electric coupling of said second ends of electrical conductor strips and said wires;
   a second protective overmold seal formed over said first protective overmold seal;
   a first slot having a predetermined width and length formed between said first conductor strip and said second conductor strip initiating at said first ends and extending longitudinally into a portion of said intermediate section;
   a second slot having a predetermined width and length formed between said first conductor strip and said second conductor strip initiating at said second ends and extending longitudinally into a portion of said intermediate section, wherein said first protective overmold seal is formed over a portion of said slot.

30. The power connection apparatus of claim 29 further comprising a framework disposed over said electric coupling of said second ends of said electrical conductor strips and said wires for providing structural support to said electric coupling wherein said framework is overmolded by said first protective overmold seal.

* * * * *